United States Patent
Burns et al.

(10) Patent No.: US 7,177,963 B2
(45) Date of Patent: Feb. 13, 2007

(54) SYSTEM AND METHOD FOR LOW-OVERHEAD MONITORING OF TRANSMIT QUEUE EMPTY STATUS

(75) Inventors: Daniel J. Burns, Aliso Viejo, CA (US); Laurence A. Tossey, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 37 days.

(21) Appl. No.: 10/173,985

(22) Filed: Jun. 19, 2002

(65) Prior Publication Data
US 2003/0149814 A1    Aug. 7, 2003

Related U.S. Application Data

(60) Provisional application No. 60/352,876, filed on Feb. 1, 2002.

(51) Int. Cl.
*G06F 3/00* (2006.01)
(52) U.S. Cl. .............. 710/52; 710/34; 710/56; 710/57; 710/213; 710/260; 710/261; 710/263; 710/266; 709/213
(58) Field of Classification Search .............. 710/52, 710/56, 57; 709/213
See application file for complete search history.

(56) References Cited

U.S. PATENT DOCUMENTS

| | | | | |
|---|---|---|---|---|
| 5,220,593 A | | 6/1993 | Zicker et al. | |
| 5,448,564 A | * | 9/1995 | Thor | 370/392 |
| 5,761,427 A | * | 6/1998 | Shah et al. | 709/223 |
| 6,031,843 A | * | 2/2000 | Swanbery et al. | 370/426 |
| 6,032,179 A | * | 2/2000 | Osborne | 709/213 |
| 6,115,779 A | * | 9/2000 | Haubursin et al. | 710/262 |
| 6,249,885 B1 | | 6/2001 | Johnson et al. | |
| 6,256,685 B1 | * | 7/2001 | Lott | 710/52 |
| 6,351,785 B1 | * | 2/2002 | Chen et al. | 710/263 |

FOREIGN PATENT DOCUMENTS

EP      0 498 201 A2    8/1992

OTHER PUBLICATIONS

European Search Report for Appl. No. EP 03 00 1895, dated May 26, 2003, 4 pages.

* cited by examiner

*Primary Examiner*—Fritz Fleming
*Assistant Examiner*—Niketa I. Patel
(74) *Attorney, Agent, or Firm*—Sterne, Kessler, Goldstein & Fox P.L.L.C

(57) ABSTRACT

A queue monitoring system and method determines when one or more transmit queues have reached a state that requires action by the host processing device, without the need for periodic polling of transmit status or excessive interrupt servicing. The queue monitoring implements an interrupt mechanism that generates an interrupt if one or more of the transmit queues has gone from a non-empty state to an empty state, and remained in the empty state for a (programmable) period of time. The combination of queue status checking (when adding new transmit data) with the queue monitoring interrupt mechanism removes the need for periodic polling of queue status and handling of interrupts generation on the completed transmission of data from one or more transmit buffer.

4 Claims, 6 Drawing Sheets

SYSTEM AND METHOD FOR LOW-OVERHEAD MONITORING OF TRANSMIT QUEUE EMPTY STATUS

CROSS-REFERENCE TO RELATED APPLICATIONS

This application is related to U.S. application Ser. No. 10/195,528, filed Jul. 16, 2002, now U.S. Publ. Appl. No. 2003/0147399, published Aug. 7, 2003, entitled "Scalable, High-Resolution Asynchronous Transfer Mode Traffic Shaper And Method" and Ser. No. 10/195,529, filed Jul. 16, 2002, now U.S. Publ. Appl. No. 2003/0147349, published Aug. 7, 2003, entitled "Communications Systems And Methods Utilizing a Device That Performs Per-Service Queuing," which are both incorporated herein by reference in their entirety.

BACKGROUND OF THE INVENTION

1. Field of the Invention

The present invention generally relates to determining when to generate interrupt signals, between a host processor and a peripheral device. For example, the peripheral device may be a transmit device.

2. Background Art

A transmit portion of a digital communications system typically supports the transmission of different types of information having differing Quality-of-Service (QoS) requirements. Exemplary information types could include encoded voice, digital video, or Internet Protocol (IP) data. In the case of Asynchronous Transfer Mode (ATM) systems, data to be transmitted is typically stored until ready for transmission in a set of queues. In ATM systems, the storage of data in a queue is often determined based on its destination and/or priority, called "per-Virtual Circuit (VC) priority queuing." Data stored in each of the queues is then transmitted at its appropriately scheduled time, which is determined based on the QoS requirements of the VC.

When implementing a transmit apparatus with multiple transmit queues, it is necessary for the host controller of the apparatus to monitor the full and empty state of each host controller queue. It is the responsibility of the host controller to release data storage buffers submitted to the host controller queue once the data associated with the buffer has been transmitted from the transmitter device queue. Typical implementations of this require the host controller to periodically poll the status of the transmit device queue or receive an interrupt from the transmit device once related host controller storage buffer data has been transmitted from the transmit device queue. Periodic polling of transmit device queue status can result in an unnecessary amount of software overhead. Also, excessive interrupt servicing can result in a slowdown of system performance.

Therefore, what is needed is a system and a method that can reduce the overhead in a host controller caused by polling of the transmit device queue and that can reduce the time spent servicing interrupt signals in the host controller.

BRIEF SUMMARY OF THE INVENTION

An embodiment of the present invention provides a method for reducing overhead in a host controller. The method includes the steps of receiving data to be stored in a host queue of the host controller and determining whether the host queue is full. If the host queue is full, the method includes the step of determining if data previously stored in the host queue and copied to a transmitter queue has been transmitted. If the copied data has been transmitted, the method includes the step of clearing the previously stored data from the host queue. The method further include the steps of detecting when the transmitter has received the copied data, starting a watchdog counter when the transmitter sends the copied data, and generating an interrupt signal when the watchdog counter equals a watchdog value. The method further includes the steps of sending the interrupt signal to the host controller and clearing a section of the host queue when the interrupt signal is received.

Other embodiments of the present invention provide a system for sending data. The system includes a host processor including a host processor memory that stores copies of data packets and a transmit device coupled to the host processor that receives, stores, and transmits the data packets. The transmit device includes a transmit device memory that stores the data packets until the data packets are transmitted and a state machine coupled to the transmit device memory that monitors for when the transmit device memory receives and transmits the data packets to determine when an interrupt should be sent to the host processor to clear the copies of the data packets from the host processor memory.

Other embodiments of the present invention provide a method of monitoring a queue in a transmit device of a communications network. The method includes the steps of a) storing data packets in a host processor queue, b) sending the data packets to the queue in the transmit device causing the queue in the transmit device to transition to a not-empty state, and c) monitoring the queue in the transmit device to determine when the queue transitions from the not-empty state back to an empty state. The method further includes the steps of d) starting a counter when the queue transitions from the not-empty state to the empty state and e) generating an interrupt signal when a counter value in the counter reaches a threshold value.

Other embodiments of the present invention provide a method of monitoring queue status. The method includes the steps of detecting when a queue has changed from an empty state to a not-empty state, starting a watchdog counter when said queue transitions back to said empty state, and generating an interrupt signal when said watchdog counter equals a watchdog value.

Other embodiments of the present invention provide a method for reducing overhead in a host controller. The method includes the steps of receiving first data at a host controller, storing the first data in the host queue, and copying the first data to a transmitter queue. The method also includes the steps of receiving second data at the host controller and determining whether the host queue is full. If the host queue is full, the method further includes the step of determining whether the first data has been transmitted from the transmitter queue. If the first data was transmitted, the method further includes the steps of clearing the first data from the host queue and storing the second data in the host queue.

Advantages of these above system and methods are that they reduce the overhead in a host controller caused by polling of the transmit device queue and that they reduce the time spent servicing interrupt signals in the host controller.

BRIEF DESCRIPTION OF THE DRAWINGS/FIGURES

The accompanying drawings, which are incorporated in and constitute a part of the specification, illustrate an embodiment(s) of the invention and, together with the description, explain the purpose, advantages, and principles of the invention.

In the drawings, like reference numbers indicate the same or substantially the same elements. Furthermore, the leftmost digit(s) of the reference numbers indicate the number of the drawing in which the reference number is first used.

DETAILED DESCRIPTION OF THE INVENTION

A transmit device including a state machine allows for interrupts to be generated only when necessary instead of periodically. The transmit device including the state machine also eliminates the need for a host processor to continuously poll the transmit device for transmit queue status. Further, the state machine reduces the number of interrupts generated by the transmit device, thereby minimizing the time and system overhead associated with servicing the interrupts.

Figure 1:
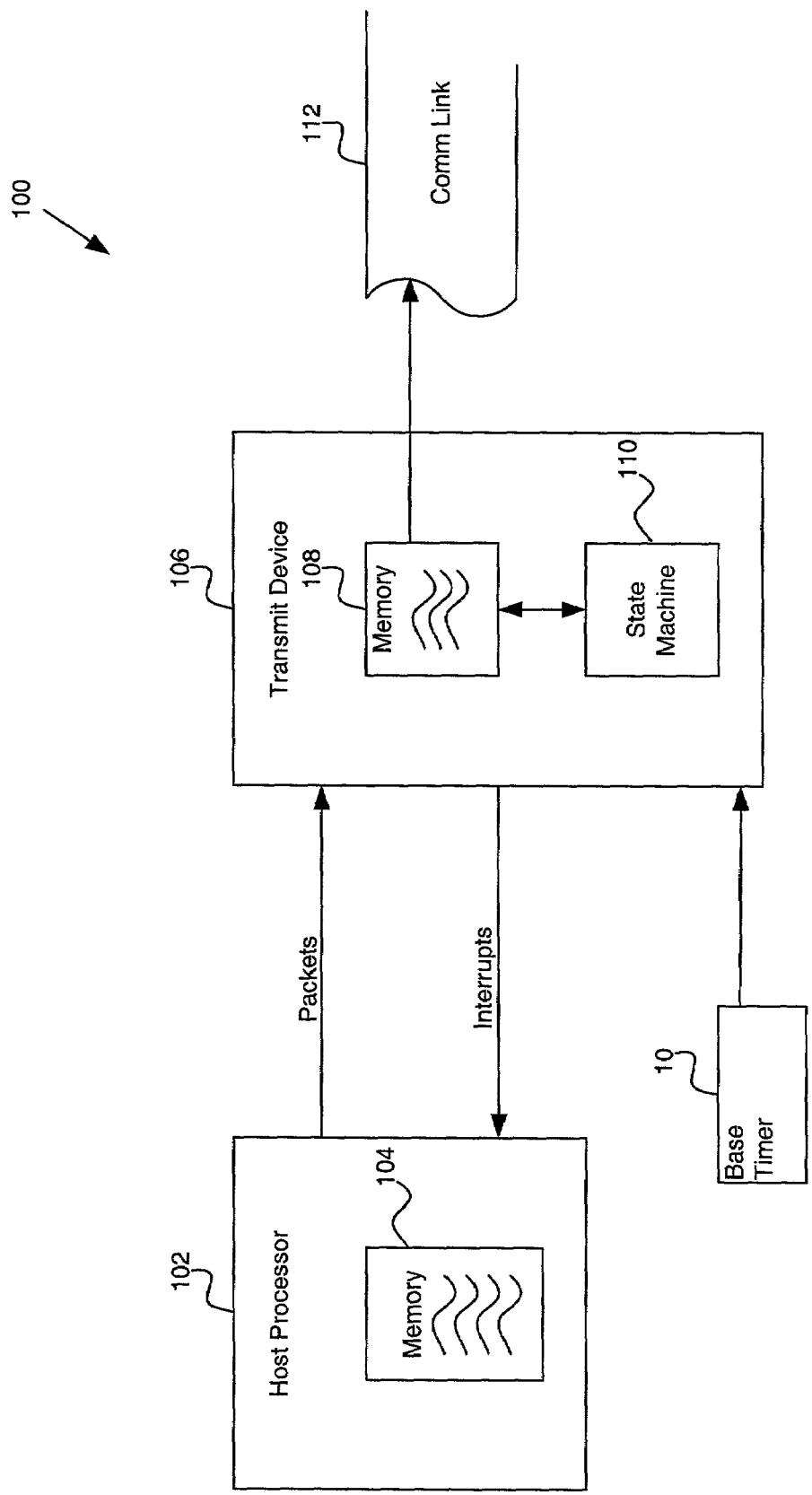
FIG. 1 illustrates a system that performs a queue monitoring method.

FIG. 1 illustrates a queue monitoring system 100 in a communications network. In one example, the communications network maybe an ATM network. The system 100 includes a host processor or controller 102 that includes a host processor memory or queue 104, which stores data packets that are to be sent over a communications link 112. The host processor 102 sends the data packets to a transmit device 106. The transmit device 106 includes a transmit device memory or queue 108, in which the data packets are stored until they are transmitted over the communications link 112, and a state machine 110. In some embodiments, the host processor 102 and the transmit device 106 can share one of the memories 104 or 108, such that the other memory 104 or 108 is not in the system 100. Once the data packets are transmitted, the transmit memory 108 is cleared. However, the processor memory 104 is not cleared until it receives an interrupt signal from the transmit device 106 or it polls the transmit device 106 to see if the transmit device queues 108 are empty. If the processor memory 104 is not periodically cleared then it will stall the transmit function, waiting for memory to become available, which causes transmit delays. Unfortunately, interrupts and polling are overhead functions that reduce overall processor speed. Therefore, it is desirable to reduce the frequency of the interrupts and the amount of polling to prevent the processor memory 104 from filling-up.

Figure 5:
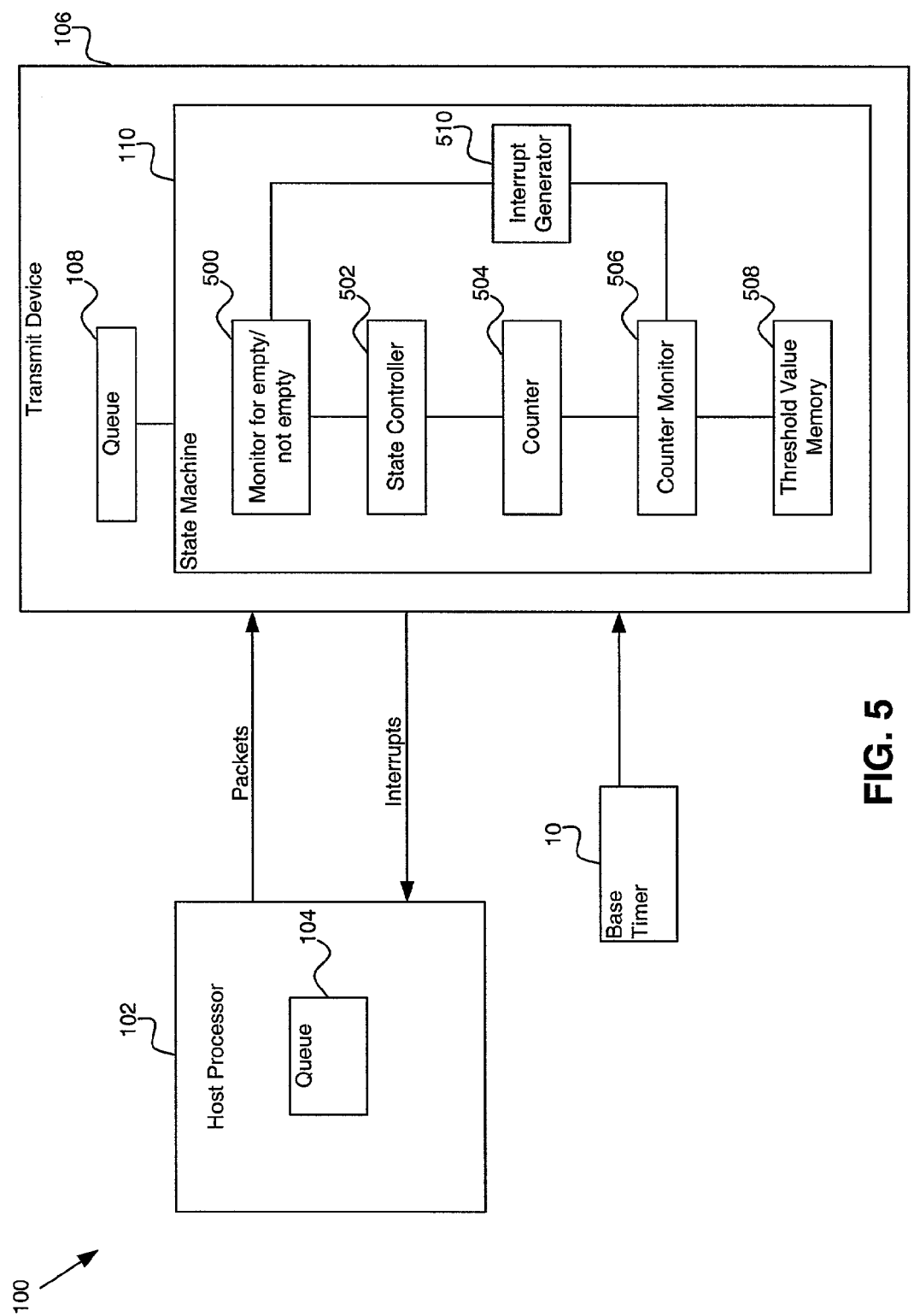
FIG. 5 is a detailed view of a state machine in the system of FIG. 1.

With reference to FIG. 5, and continuing reference to FIG. 1, the system 100 further includes: a 'n' millisecond timer 10, called the base timer; 'm' state machines 110; 'm' counters 504 of length 'p' bits, called the watchdog counters; 'q' time period compare values of length 'p', called threshold or watchdog values, that are stored in a threshold or watchdog value memory 508. The value of 'm' is equal to the number of supported transmit queues 108. The base timer 10 is the master timer of the queue monitoring system 100 and is a free running timer that provides a pulse every 'n' milliseconds. One embodiment of the system 100 uses a value of 50 for 'n', corresponding to a base timer resolution of 50 milliseconds.

Figure 2:
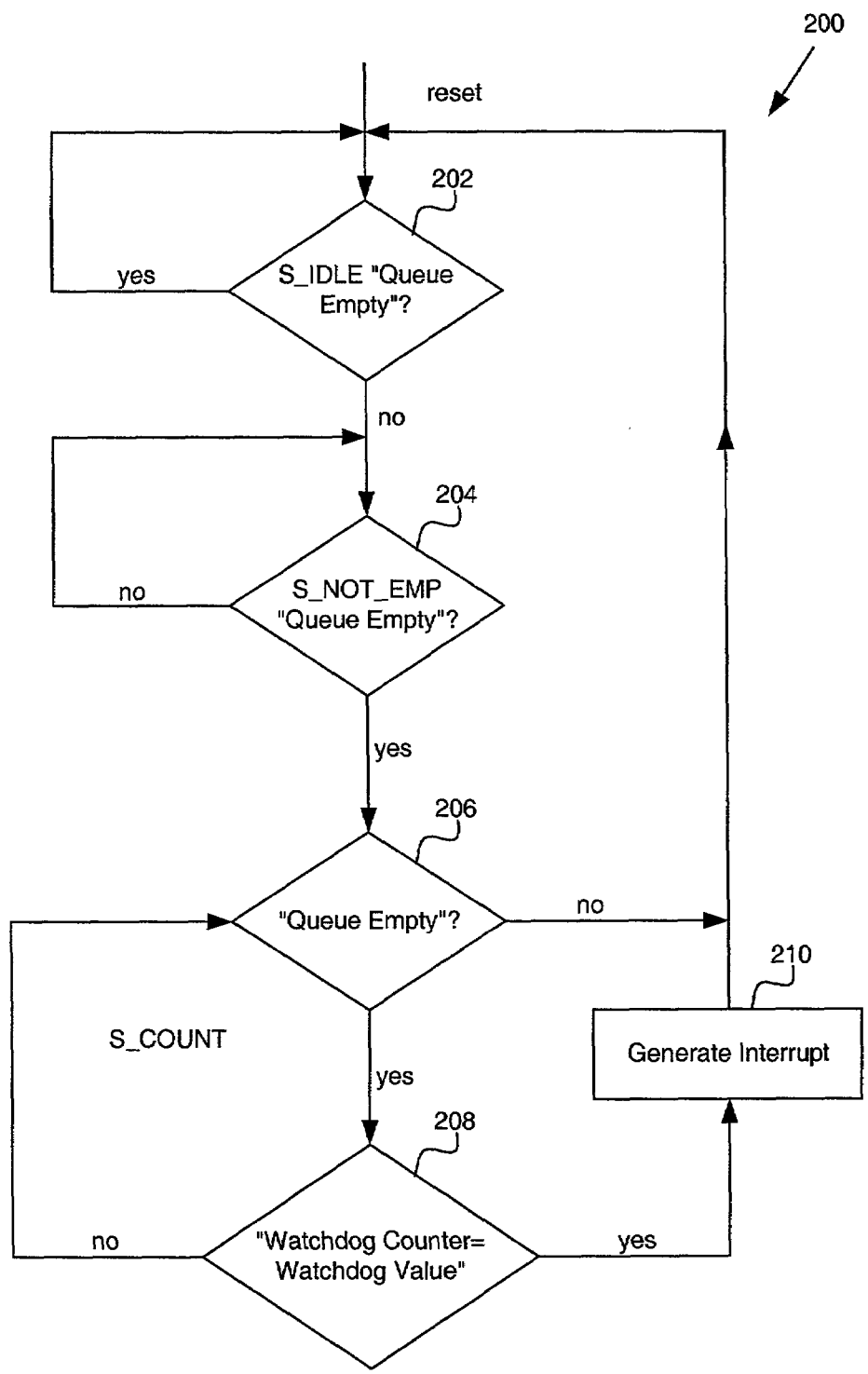
FIG. 2 illustrates a portion of the queue monitoring method according to embodiments of the present invention.
Figure 3:
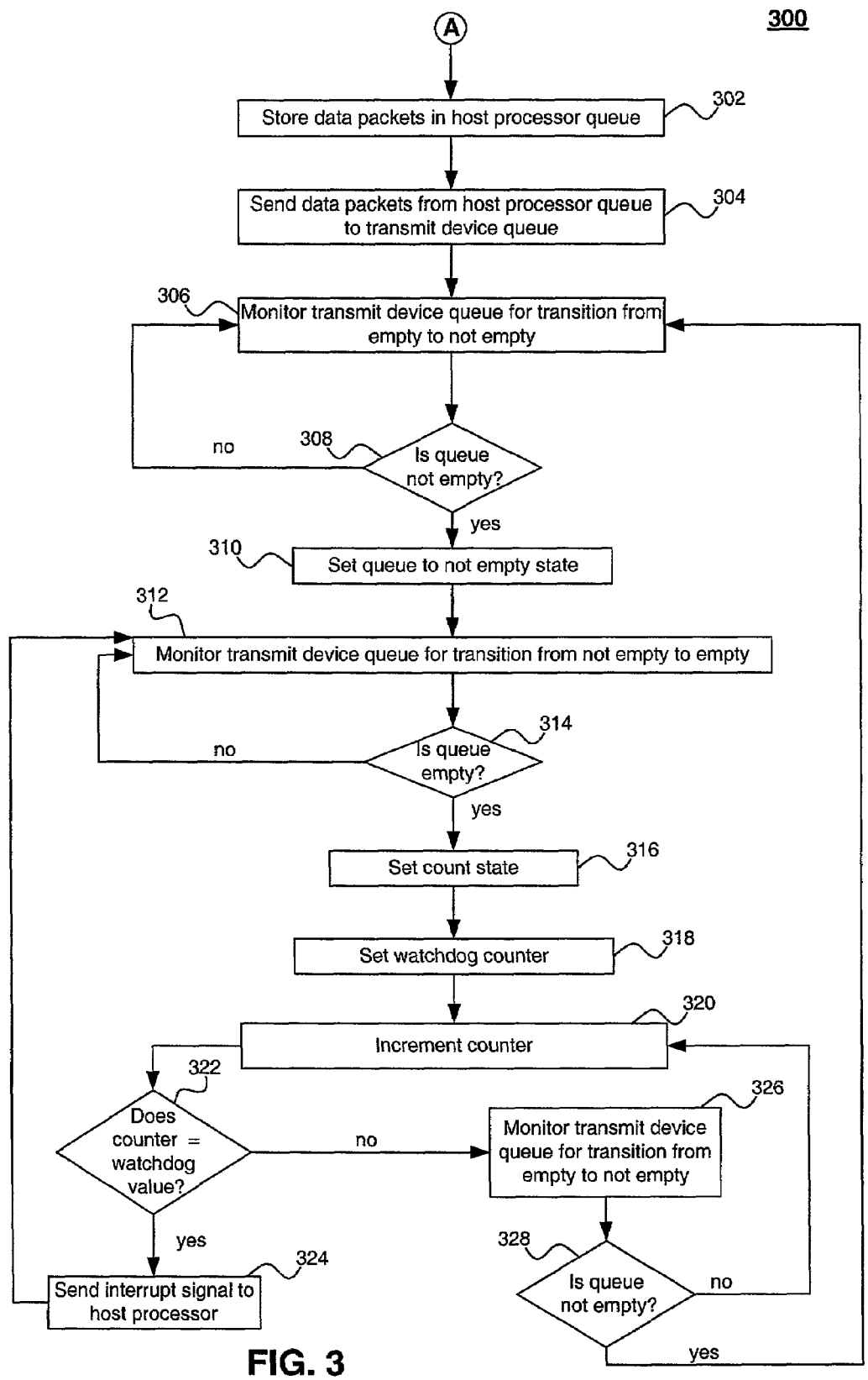
FIG. 3 is a flow chart showing a portion of the queue monitoring method performed substantially in a state machine.
Figure 4:
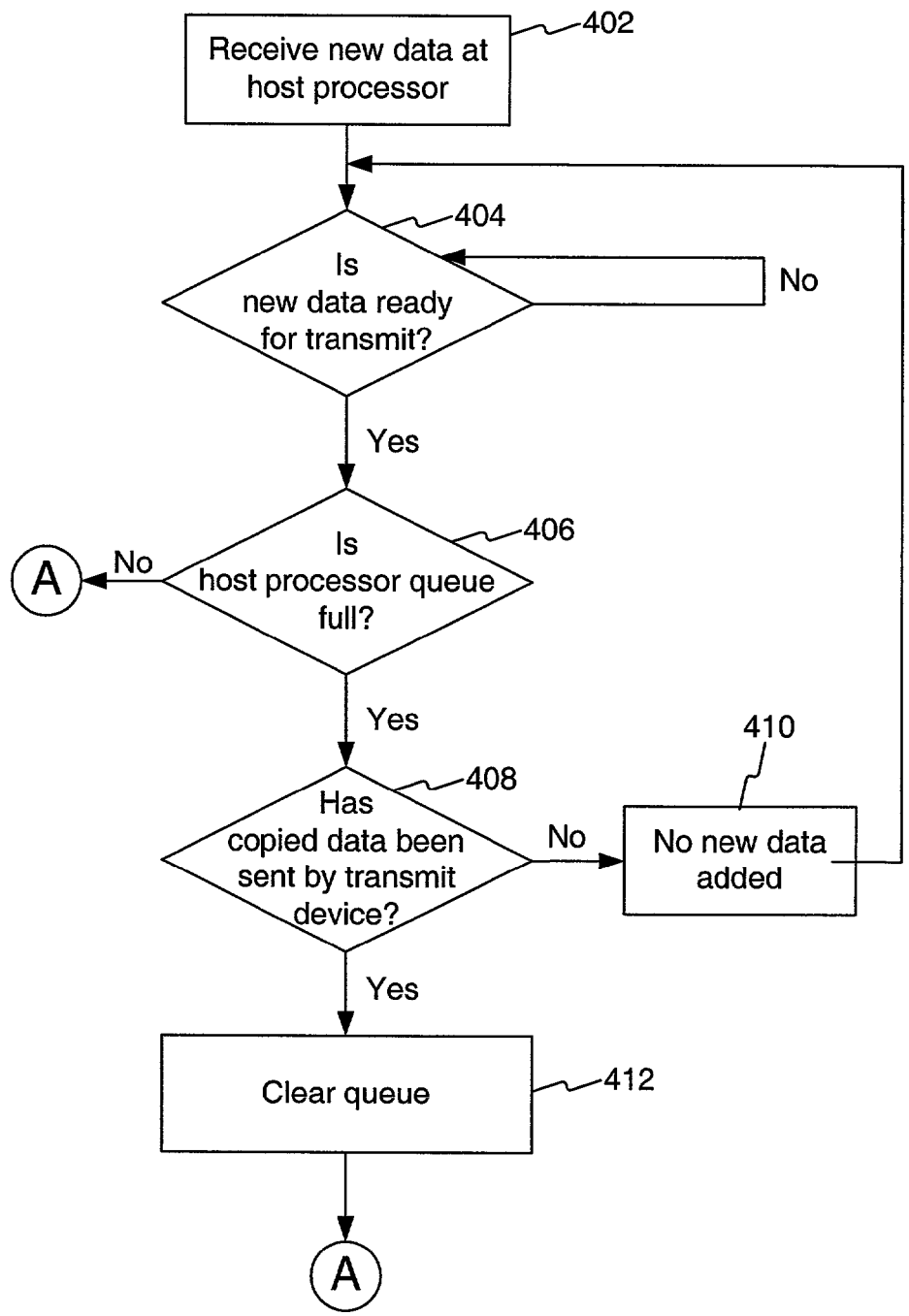
FIG. 4 is a flow chart showing a portion of the queue monitoring method performed in a host processor according to embodiments of the present invention.

FIGS. 1 and 5 also show the state machine 110 monitoring the transmit memory 108 with a monitoring device 500, which may be a monitor device to monitor for empty or not-empty states of the queue 108. The state machine 110 provides implementation of the queue interrupt methods 200–400 that are shown in FIGS. 2–4. The state machine 110 also includes a state controller 502 that is coupled the monitor 500 and a counter monitor 506 that is coupled between a counter 504, which may be a watchdog counter, and the memory 508. The state machine 110 further includes an interrupt generator 510 that is coupled to both the monitor 500 and the counter monitor 506.

As seen in the FIG. 2, the S_IDLE state is entered on reset of the transmit device 106 as determined by the state controller 502 in step 202. In step 204, the monitor 500 determines whether the transmit queue 108 is not-empty (i.e. has data been received). If the answer is no, (i.e. the transmit queue 108 is empty), then no packets have been received from the host controller 102, and the state controller 502 returns the state machine 110 to step 204 until a packet is received. Once the associated queue 108 becomes not-empty (i.e. data has been received), the state controller 502 moves the state machine 110 into the S_NOT_EMPTY state, where the state machine 110 waits until the queue 108 again becomes empty (i.e. data has been transmitted). In step 206, the monitor 500 determines when the queue 108 is again empty (i.e. the received packets have been transmitted). Once the queue 108 becomes empty, the state controller 502 moves the state controller 502 into the S_COUNT state in steps 206 and 208 and the watchdog counter 504 is started. At this point, the state machine 110 "ping-pongs" between steps 206 and 208 until the interrupt generator 510 detects either: (1) a signal from the monitor 500 that the queue 108 has become not-empty again (i.e. new packet received) or (2) a signal from the counter monitor 506 that the counter 504 has reached a count equal to the watchdog or threshold value (threshold count value) accessed from the memory 508. The occurrence of either of these events received from either the monitor 500 or the monitor 506 will result in the state controller 502 moving the state machine 110 back to the S_IDLE state 202. Also, the state machine 100 generates an interrupt at step 210 that is sent to the host controller 102 to clear its memory 104.

The watchdog counter 504 remains idle with a count value of zero until the state machine 110 reaches the S_COUNT state. Once in the S_COUNT state, the watchdog counter 504 will increment on each occurrence of the base timer 10. When the watchdog counter 504 reaches a count equal to the threshold value accessed from the memory 508, the interrupt generator 510 generates the interrupt at step 210 to the host processor 102 indicating that the queue 108 has been empty for a period of time equal to the value of the watchdog or threshold value times the base timer. For example, if the base timer is 50 mS ('n'=50) and the watchdog or threshold value is 10, then the interrupt for this queue 108 will occur whenever the queue 108 goes from not-empty to empty and remains empty for at approximately (10×50 mS), or 500 milliseconds.

The exact timing of the interrupt is non-deterministic, but will always be within the range of (base timer×(watchdog value−1)) and (base timer×watchdog value). The reason for this is that there is no correlation between the value of the base timer 10 and when the state machine 110 enters the S_COUNT state because the base timer 10 is free running. In one embodiment, a watchdog or threshold value of zero will result in the occurrence of an immediate interrupt when the queue 108 goes from a non-empty state to an empty state.

A resolution of the interrupt is defined by the parameter 'n' of the time 10 and is determined by a desired resolution of the interrupt. The length of the watchdog counter 504 and watchdog or threshold value from memory 508 are the same and defined by the parameter 'p'. The value of 'p' is determined based on the desired range of interrupt time. One embodiment of a queue monitoring algorithm uses a value of 4 for 'p' which, if 'n' were equal to 50, would result in a range of interrupt delay times from a minimum of zero to a maximum of (50 mS×($2^4-1$)) or (50 mS×15), which equals 750 milliseconds. The number of watchdog (compare) or threshold values is defined by the parameter 'q' and is equal to one or 'm'. For simpler implementation, all queues 108 can share the same watchdog or threshold value. To allow the interrupt time to be configured differently for each queue 108, a watchdog or threshold value must be made available for each queue ('q'='m').

Turning now to FIGS. 3–4, with continuing reference to FIGS. 1, 2, and 5, the system 100 is further described with reference to flowcharts 300 and 400. As can be seen, the methods performed in FIGS. 3–4 are connected via A and B.

In FIG. 3, a method 300 is shown that is performed substantially in the state machine 110. Two steps are performed in the host processor 102, which are when data is stored in the host processor queue at step 302 and when the stored data is sent to the transmit device queue at step 304. The remaining steps of the method 300 are performed by the state machine 110 in the transmit device 106 and as described further below.

In the transmit device 106, the monitor 500 monitors for when the transmit device queue 108 transitions from empty to not-empty at step 306. A determination is performed at step 308 to see if the transmission device queue 108 is not-empty. If no, the method 300 continues to monitor for the transition. If yes, the state machine 110 is set to a queue not-empty state at step 310 by the state controller 502. Then, the monitor 500 monitors for when the transmission device queue 108 transitions from not-empty back to empty at step 312. A determination step is performed at step 314 to see if the transmission device queue 108 is empty. If no, the monitor 500 continues to monitor for the transition at step 312. If yes, the state machine 110 is set to a count state at step 316 and the counter 504 is started at step 318. At step 320, the counter 504 is incremented with each occurrence of the base timer 10 or each receipt of a signal from step 328. At step 322 a determination is made by the counter monitor 506 whether the counter 504 equals the watchdog value stored in threshold value memory 508. If yes, the interrupt generator 510 sends an interrupt signal to the host processor 102 at step 324. If no, the monitor 500 monitors the transmit device queue 108 to see if it has gone from empty to not empty at step 326. A determination is made at step 328 whether or not the transmit device queue 108 is not empty (i.e., data has been received). If no, the method 300 returns to step 320. If yes, the method 300 returns to step 306.

Therefore, the host processor 102 no longer needs to poll the transmit device 106 because an interrupt signal is automatically generated and transmitted when a transmit queue 108 has remained empty (i.e., no new packets were put in the transmit queue 108) for a period of time equal to the watchdog value. Also, because of the automatic nature of the interrupt signal, the excessive periodic generation of interrupt signals is eliminated. Through these two modifications, the embodiments of the present invention reduce the overhead in a host processor 102 caused by: (1) polling of the transmit device queue 108 by the host processor 102 and (2) the time spent servicing interrupt signals in the host controller 102.

Turning now to FIG. 4, a method 400 performed by the host processor 102 will be discussed. At step 402, the host processor 102 receives new data. At step 404, a determination is made whether the new data is ready for transmission. If no, the method 400 continues to check whether the new data is ready for transmission. If yes, the host processor 102 checks whether the host processor queue 104 is full at step 406. If no, method 300 is performed. If yes, at step 408 the host processor 102 determines whether data previously stored in the host processor queue 104 and copied to the transmit device queue 108 has been sent by the transmitter 106. If no (no data packet(s) has been transmitted), at step 412 no new data is added to the host processor queue 104 and the method 400 returns to step 404. If yes (a data packet(s) has been transmitted), at step 412 the host processor queue 104 is cleared and method 300 is performed.

A queue monitoring system 100 and methods 200, 300, and 400 determine when one or more transmit queues 108 have reached a state that requires action by the host processing device 102, without the need for periodic polling of transmit queue status or excessive interrupt servicing. The queue monitoring methods 200, 300, and 400 assume that any time the host controller 102 wants to add new data to a queue 108 it will first check the queue status of the transmit queues 108, ensuring that the queue 104 is not full at step 404 and determining if any data storage buffers 104 can be released at step 406. The queue monitoring also implements an interrupt mechanism 510 that generates an interrupt at step 324 if one or more of the transmit queues 108 has gone from a non-empty state to an empty state, and has remained in the empty state for a threshold period of time accessed from the memory 508. The combination of queue status checking with method 400 (when adding new transmit data) and the queue monitoring interrupt mechanism with method 300 removes the need for periodic polling of queue status and reduces the handling of interrupts generated based on the completed transmission of data from one or more transmit buffers 108.

It can be appreciated that the present invention is not limited to the communications environment described in FIGS. 1 and 5. The queue detection methods 200–400 can be implemented in an environment where an interrupt is to be generated to indicate the status or the completion of some task. Also, the interrupt signal can be sent to come processor or other control device.

The state machine 110 can be implemented with logic devices to perform the functions and steps recited in FIGS. 2–4. Alternatively, the functions and steps in FIGS. 2–4 can be implemented in a processor, such as a microprocessor, embedded processor, etc. The processor can execute computer program code to form the steps of FIGS. 2–4. The computer program code can be stored and retrieved on a computer useable medium such as memory, computer disk, or the like.

Figure 6:
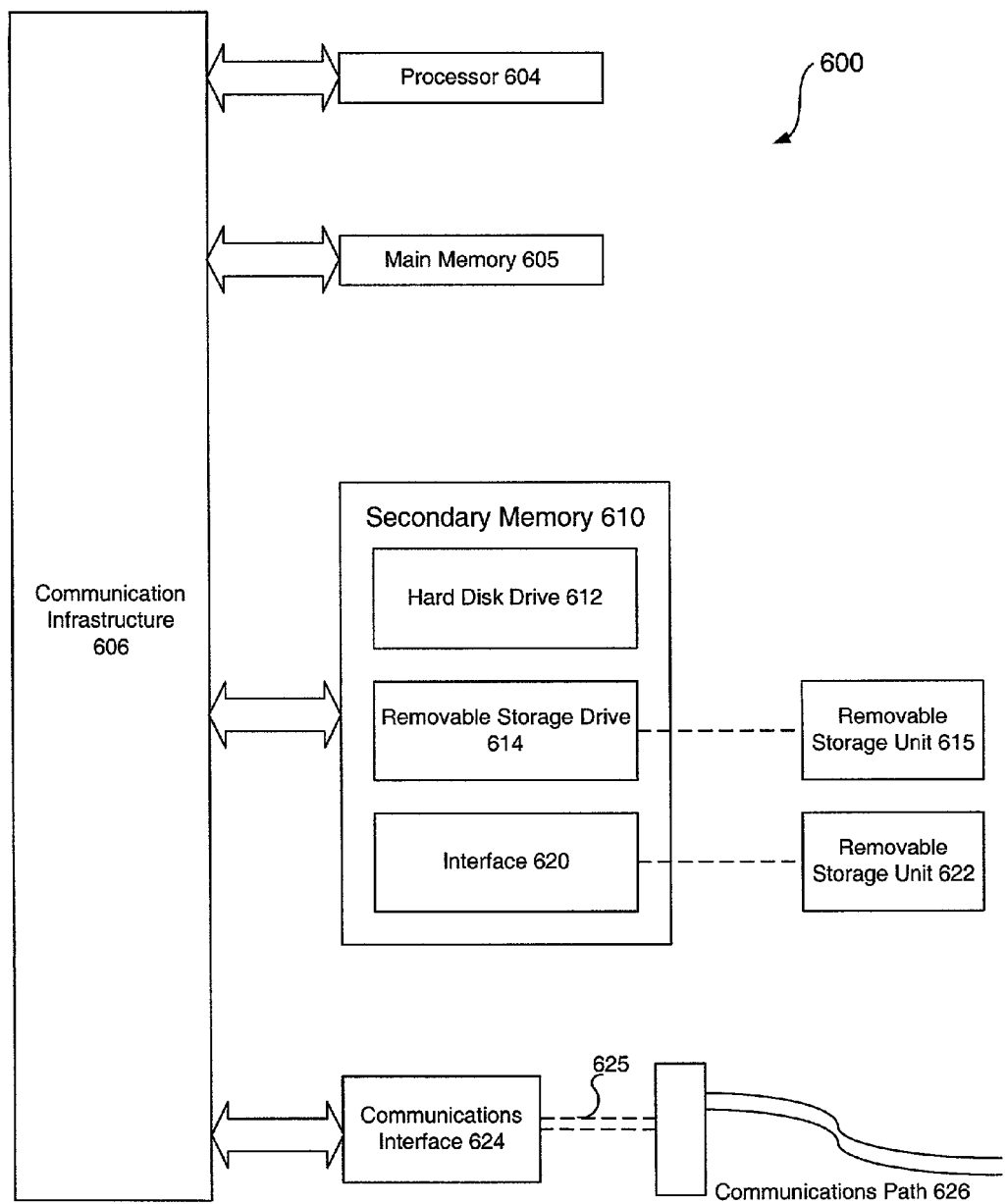
FIG. 6 depicts a computer system according to embodiments of the present invention.

For instance, FIG. 6 illustrates one or more processors, such as processor 604. Processor 604 can be a special purpose or a general purpose digital signal processor. The processor 604 is connected to a communications infrastructure 606 (for example, a bus or network). Various software implementations are described in terms of this exemplary computer system. After reading this description, it will become apparent to a person skilled in the relevant art how to implement the invention using other computer systems and/or computer architectures.

Computer system 600 also includes a main memory 608, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618, represents a floppy disk, magnetic tape, optical disk, etc. which is read by and written to by removable storage drive 614. As will be appreciated, the removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a PCM-CIA slot and card, etc. Software and data transferred via communications interface 624 are in the form of signals 628 which may be electronic, electromagnetic, optical or other signals capable of being received by communications interface 624. These signals 628 are provided to communications interface 624 via a communications path 626. Communications path 626 carries signals 628 and may be implemented using wire or cable, fiber optics, a phone line, a cellular phone link, an RF link and other communications channels.

In this document, the terms "computer program medium" and "computer usable medium" are used to generally refer to media such as removable storage drive 614, a hard disk installed in hard disk drive 612, and signals 628. These computer program products are means for providing software to computer system 600.

Computer programs (also called computer control logic) are stored in main memory 608 and/or secondary memory 610. Computer programs may also be received via communications interface 624. Such computer programs, when executed, enable the computer system 600 to implement the present invention as discussed herein. In particular, the computer programs, when executed, enable the processor 604 to implement the processes of the present invention, such as the method(s) implemented using the oscillator structure 100 described above, such as method 300, for example. Accordingly, such computer programs represent controllers of the computer system 600. By way of example, in the embodiments of the invention, the processes performed by the signal processing blocks of oscillator 100 can be performed by computer control logic. Where the invention is implemented using software, the software maybe stored in a computer program product and loaded into computer system 600 using removable storage drive 614, hard drive 612 or communications interface 624.

CONCLUSION

Example embodiments of the present invention have been described herein. As noted elsewhere, these example embodiments have been described for illustrative purposes only, and are not limiting. Other embodiments are possible and are covered by the invention. Such embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalence.

What is claimed is:

1. A system for sending data, said system comprising:
   a host processor including a host processor memory that stores copies of data packets; and
   a transmit device coupled to said host processor that receives, stores, and transmits said data packets, said transmit device including:
      a transmit device memory that stores said data packets until said data packets are transmitted, and
   a state machine coupled to said transmit device memory that monitors for when said transmit device memory receives and transmits said data packets to determine when an interrupt should be sent to said host processor to clear said copies of said data packets from said host processor memory, wherein said state machine comprises,
      a monitor that determines a status of said transmit device memory;
      a counter that starts counting once said monitor determines said status has transitioned from a not-empty state to an empty state; and
      an interrupt signal generator that generates an interrupt signal when said counter reaches a threshold value.

2. The system of claim 1, wherein said state machine further comprises:
   a counter monitor coupled to said counter; and
   a threshold value memory coupled to said counter monitor that stores said threshold value;
   wherein said counter monitor determines if said counter has reached said threshold value to trigger said interrupt signal generator to generate said interrupt signal.

3. A method of monitoring a queue in a transmit device of a communications network, said method comprising the steps of:
   a) storing data packets in a host processor queue;
   b) sending said data packets to said queue in said transmit device causing said queue in said transmit device to transition to a not-empty state;
   c) monitoring said queue in said transmit device to determine when said queue transitions from said not-empty state back to an empty state;
   d) starting a counter when said queue in said transmit device transitions from said not-empty state to said empty state; and
   e) generating an interrupt signal when a counter value in said counter reaches a threshold value
   (f) sending said interrupt signal to a host processor; and
   (g) clearing said host processor queue when said interrupt signal is received.

4. A method of monitoring queue status, comprising the steps of:

detecting when a queue has changed from an empty state to a not-empty state;
starting a watchdog counter when said queue transitions back to said empty state; and
generating an interrupt signal when said watchdog counter equals a watchdog value;

sending said interrupt signal to a host processor; and
clearing a memory space of said host processor upon receipt of said interrupt signal.

* * * * *